Inventor
J. PEETERS
By Albert [signature]
Attorney

Inventor
J. PEETERS
By Albert Peiss
Attorney

Sept. 11, 1962 J. A. PEETERS 3,053,530

MECHANISM FOR THE AUTOMATIC PROCESSING OF DOCUMENTS

Filed April 14, 1959 14 Sheets-Sheet 3

*Inventor*
J. PEETERS
*By* Albert Reiss
*Attorney*

Sept. 11, 1962 J. A. PEETERS 3,053,530

MECHANISM FOR THE AUTOMATIC PROCESSING OF DOCUMENTS

Filed April 14, 1959 14 Sheets-Sheet 4

*Inventor*
J. PEETERS
*By* Albert Peirs
*Attorney*

Sept. 11, 1962 J. A. PEETERS 3,053,530

MECHANISM FOR THE AUTOMATIC PROCESSING OF DOCUMENTS

Filed April 14, 1959 14 Sheets-Sheet 5

*Inventor*
J. PEETERS
*By* [signature]
*Attorney*

Sept. 11, 1962 J. A. PEETERS 3,053,530

MECHANISM FOR THE AUTOMATIC PROCESSING OF DOCUMENTS

Filed April 14, 1959 14 Sheets-Sheet 6

*Inventor*

J. PEETERS

*By* Albert Weiss

*Attorney*

Sept. 11, 1962 J. A. PEETERS 3,053,530

MECHANISM FOR THE AUTOMATIC PROCESSING OF DOCUMENTS

Filed April 14, 1959 14 Sheets-Sheet 7

*Inventor*
J. PEETERS
*By* [signature]
*Attorney*

Inventor
J. PEETERS
By Albert A. Pers
Attorney

Sept. 11, 1962 J. A. PEETERS 3,053,530

MECHANISM FOR THE AUTOMATIC PROCESSING OF DOCUMENTS

Filed April 14, 1959 14 Sheets-Sheet 9

*Inventor*
J. PEETERS
*By* Albert [signature]
*Attorney*

Inventor
J. PEETERS
By [signature]
Attorney

Sept. 11, 1962 J. A. PEETERS 3,053,530

MECHANISM FOR THE AUTOMATIC PROCESSING OF DOCUMENTS

Filed April 14, 1959 14 Sheets-Sheet 11

*Inventor*

J. PEETERS

*By* Albert Leiss

*Attorney*

Sept. 11, 1962 J. A. PEETERS 3,053,530

MECHANISM FOR THE AUTOMATIC PROCESSING OF DOCUMENTS

Filed April 14, 1959 14 Sheets-Sheet 12

Inventor
J. PEETERS
By Albert Leiss
Attorney

MECHANISM FOR THE AUTOMATIC PROCESSING OF DOCUMENTS

Filed April 14, 1959 14 Sheets-Sheet 13

*Inventor*
J. PEETERS
*By* Albert Pesso
*Attorney*

MECHANISM FOR THE AUTOMATIC PROCESSING OF DOCUMENTS

Inventor
J. PEETERS
By [signature]
Attorney 3,053,530

MECHANISM FOR THE AUTOMATIC PROCESSING OF DOCUMENTS

Jozef Arthur Peeters, Antwerp, Belgium, assignor to International Standard Electric Corporation, New York, N.Y., a corporation of Delaware Filed Apr. 14, 1959, Ser. No. 806,280
Claims priority, application Netherlands Apr. 16, 1958
5 Claims. (Cl. 271—30)

The invention relates to a mechanism for the automatic processing of documents such as cheques, and more particularly to a mechanism adapted to seize documents one by one out of a pile.

A mechanism of this kind can be used in a machine intended to insert such documents in individual envelopes which can be provided with coded information corresponding to inscriptions to be found on the document. Such a machine is described in the Belgian Patent No. 536,753 (E. McWhirter 58). In this machine, the mechanism which extracts documents one by one out of a pile, inserts each document in an envelope immediately after the extraction. This entails the drawback that it is difficult to read the document when the envelopes used have become less transparent due to the unpolishing which is inevitably produced at their outer surface after a certain time of use. On the other hand, if for whatever reason it is desired to have access to a document after its separation from the pile, or if it is desired to intercalate manually a document, these operations become difficult with such a mechanism.

Another drawback of the mechanism cited above is that if a document is perforated (for instance for mechanographical purposes) and that there are perforations at the place where the suction device of the extracting pneumatic device is put, the following document will be sucked through said perforations and two documents will thus be introduced in a same envelope. The same inconvenience of introducing more than one document in a same envelope can occur if documents stick to each other for one reason or another.

An object of the present invention is to provide a mechanism of the kind mentioned above with an intermediate position between the store where the pile of documents is deposited and the output of the mechanism, this intermediate position will permit easy reading of the document and provide for easy access to it.

Another object is to provide this mechanism with a device acting on the surface of the document opposite to that where the extracting device acts, in order to withhold an eventual document which would have been carried away at the same time as the preceding one.

According to a characteristic of the invention, the mechanism comprises a second pneumatic device which takes over by the opposite face the document extracted by said first pneumatic device, deposits it on an inclined support and returns to its departure point by always moving behind the document so as neither to hinder nor to delay the reading of the latter.

According to another characteristic of the invention, the mechanism comprises a third pneumatic device located slightly below the document store, behind the trajectory followed by the documents when they are taken from the store to the reading position and the suction devices of which are directed towards the opposite face of the document which is being displaced; on the other hand the movement of the first pneumatic device is such that said opposite face will slightly touch said third device to permit the latter to act suitably.

The above mentioned and other objects and features of the invention will become more apparent and the invention itself will be best understood by referring to the following description of an embodiment taken in conjunction with the accompanying drawings in which:

By putting FIG. 1 to the left of FIG. 2, a plan view of the storage place will be obtained;

FIG. 3 is a back view of the store presser;

By putting FIG. 4 to the left of FIG. 5, an elevation view is obtained of the storage place and of the pneumatic devices associated therewith;

Figure 8:
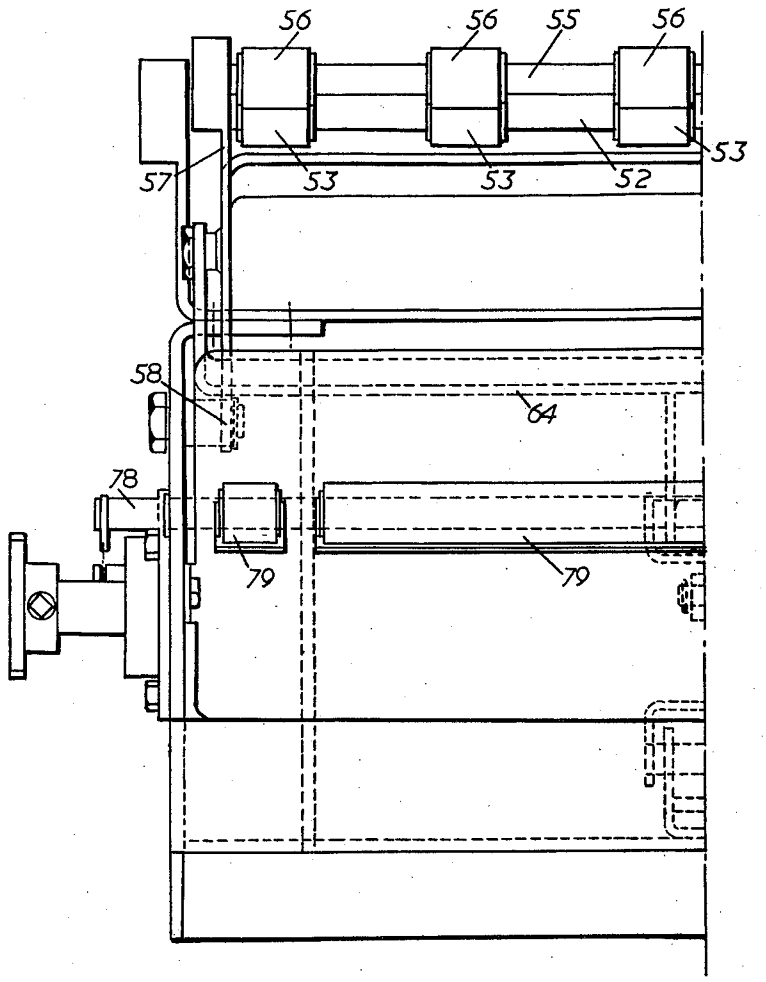
Figure 9:
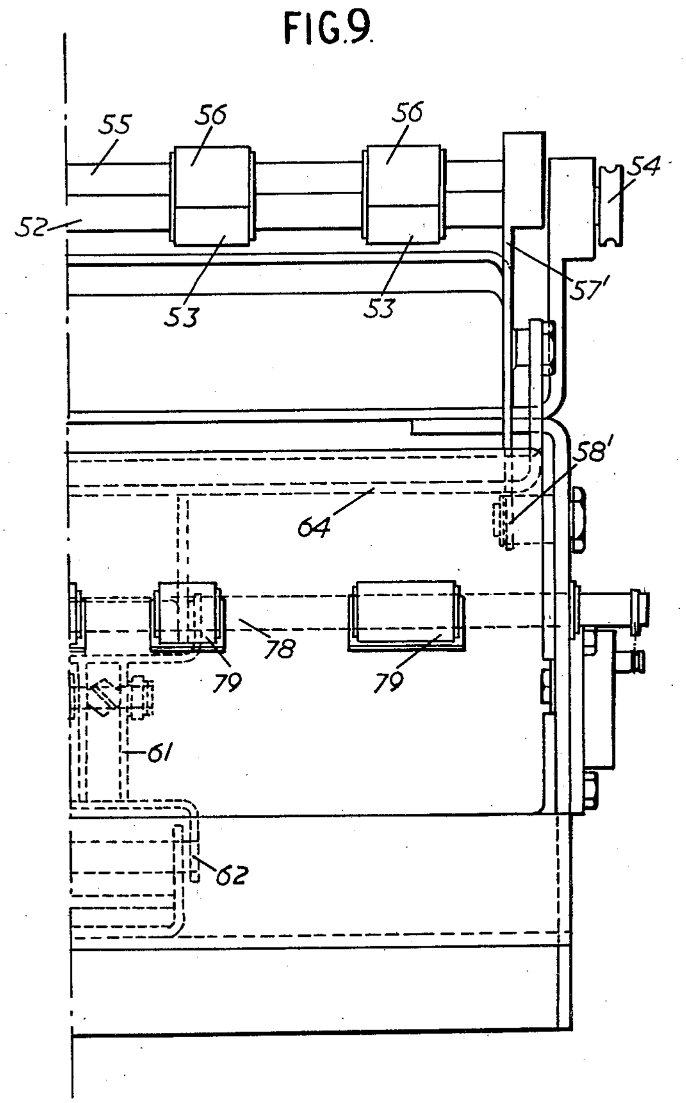
Figures 10, 11:
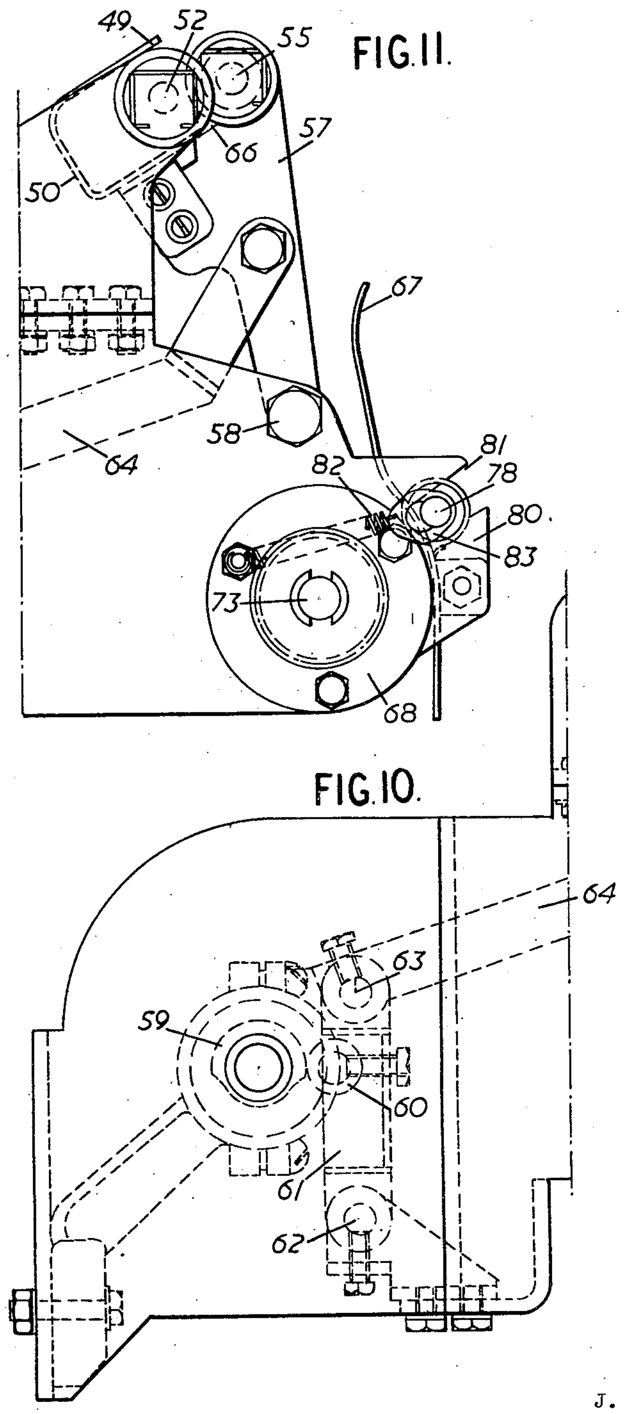
Figure 12:
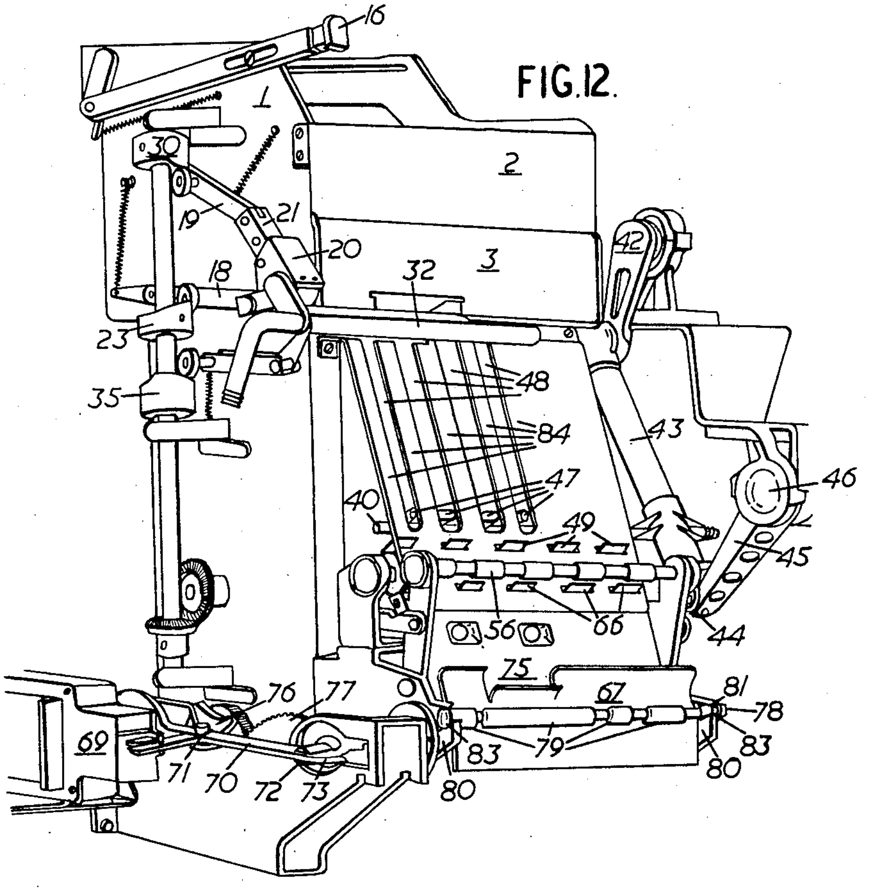
Figure 13:
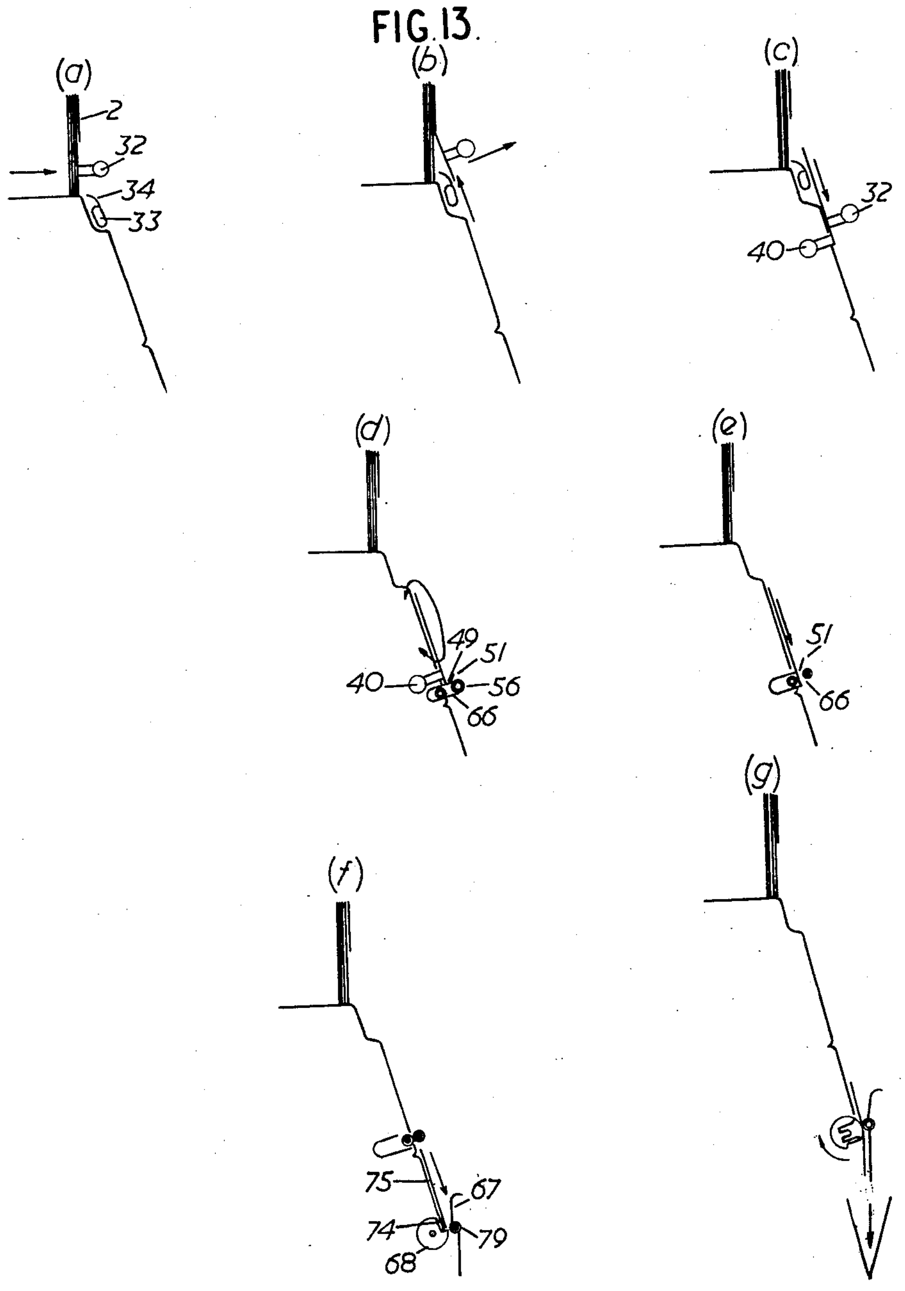
Figure 14:
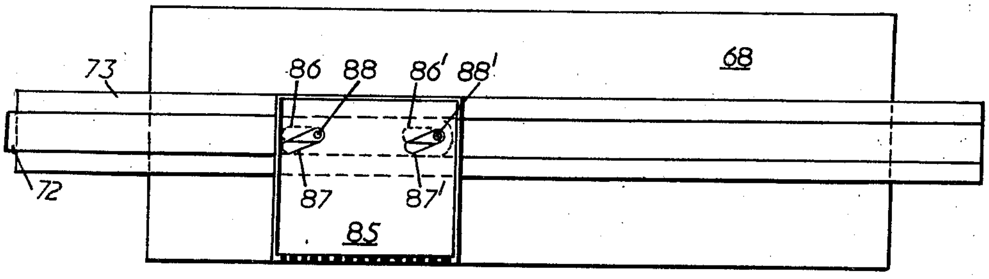

By putting FIG. 8 to the left of FIG. 9, a front view is obtained of the mechanism evacuating the document from the reading position to another device;

By putting FIG. 10 to the left of FIG. 11, a left-hand side view is obtained of the mechanism represented on FIGS. 8 and 9;

FIG. 12 is a perspective drawing of the whole mechanism;

FIG. 13 represents schematically the various phases of operation;

FIG. 14 represents a section of a roller causing a printing mechanism used for the optional printing of an uncoded information on the back of the document.

Figure 16:
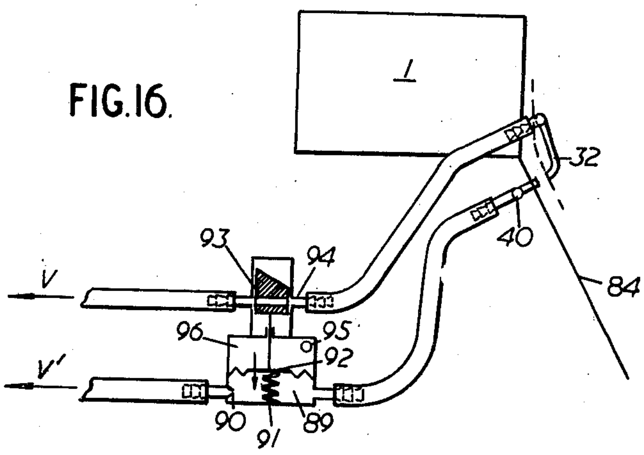
Figure 15:
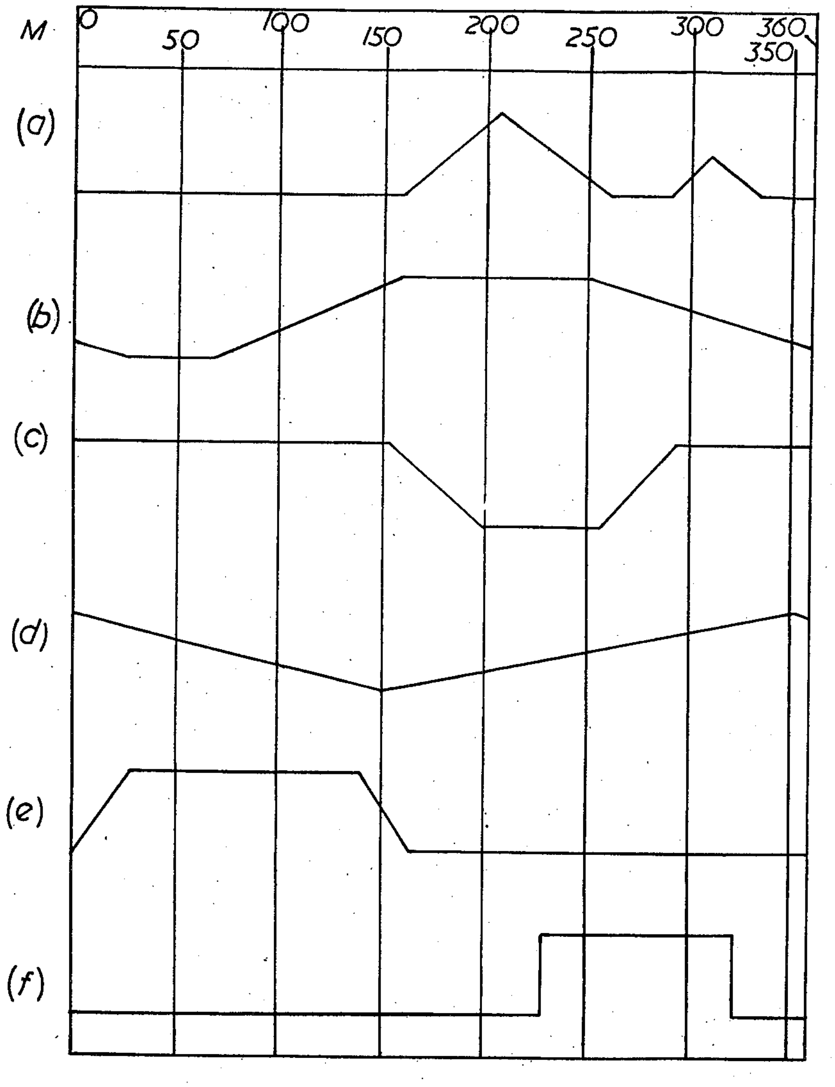

FIG. 15 is a group of graphs representing the phase relation between the movements and actions of the elements constituting the machine;

FIG. 16 is a schematic of the control by means of a pneumatic relay, of the action of the first pneumatic device by the depression conditions of the second pneumatic device.

In the preferred embodiment of a machine according to the invention the cheque store is constituted by a rhomboid case 1 without its back and upper walls and whose front wall is constituted of a part 2 retaining the cheques at their upper part while their lower part can be seized by the pneumatic device 32. The cheques are maintained against part 2 by a presser 3 mounted on rollers 4 and rolling on the base wall of the store. This presser is pushed forwards by spring 5 the movement of which is successively transmitted by lever 6 fixed to shaft 7 on which is fixed the double arm 8 each branch of which is connected by an articulation 9 to an end of a shaft 10, the other end of shafts 10 being articulated in 11, at the back of the presser. The above mentioned parts are represented on FIGS. 1 to 6. For the part of the description which follows immediately below reference can principally be made to FIG. 6.

When it is desired to fill the store, presser 3 is first of all to be pushed back; this movement is effected by means of a shaft 12 articulated in 13 on lever 6 and rolling on lug 14 due to button-hole 15. By exerting with the finger a pressure on button 16 fixed to the front end of shaft 12, lever 6 pivots backwards; when the pressure is released on button 16, spring 5 restores lever 6 to the front.

The cheques are extracted one by one out of the store by the pneumatic device 32 the movement of which is determined by the set of levers 18, 19 and connecting pieces 20, 21. The main movement of vertical translation is performed by lever 18 pivoting around axis 22 and actuated by cam 23 on which rolls roller 24 whose axis is integral with lever 18. Spring 17 urges lever 18 to maintain roller 24 in contact with cam 23. The front end of this lever is articulated in 25 on part 20 carrying the pneumatic device 32. This part 20 is on the other hand articulated in 26 on part 21 which in its turn is articulated in 27 at an end of lever 19. This lever 19 pivots on an axis 28 and carries a roller 29 rolling on cam 30. The movement of device 32 is made in four strokes:

(1) Roller 24 is pushed upward by cam 23 and the assembly 18, 20 and 21 pivots around points 22 and 27. During this movement points 25 and 26 are brought backwards due to the fact that the movement of parts 18 and 21 is angular; but this backward displacement of point 26 is more important than that of point 25, so that the trajectory of the suction part 32 is approximately rectilinear and vertical.

Figure 1:
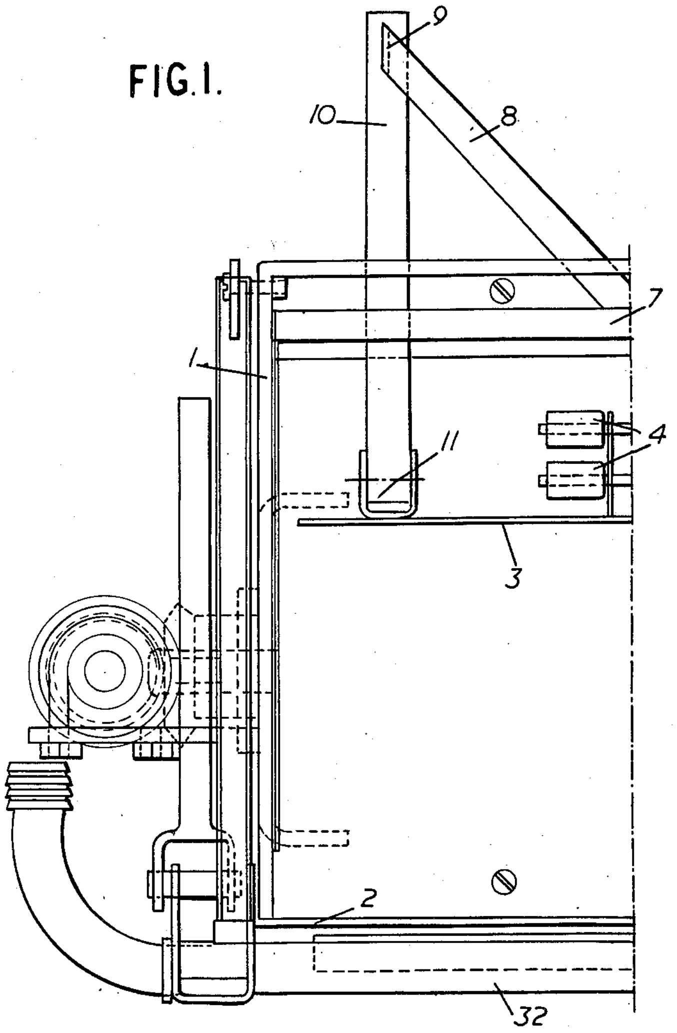
Figure 2:
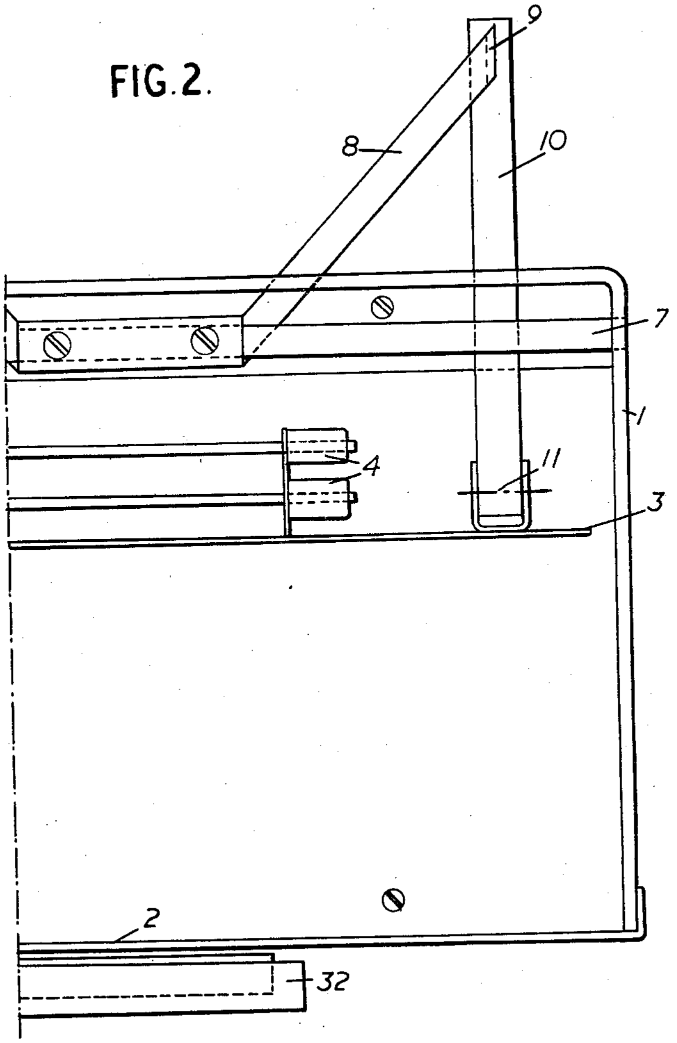
Figure 3:
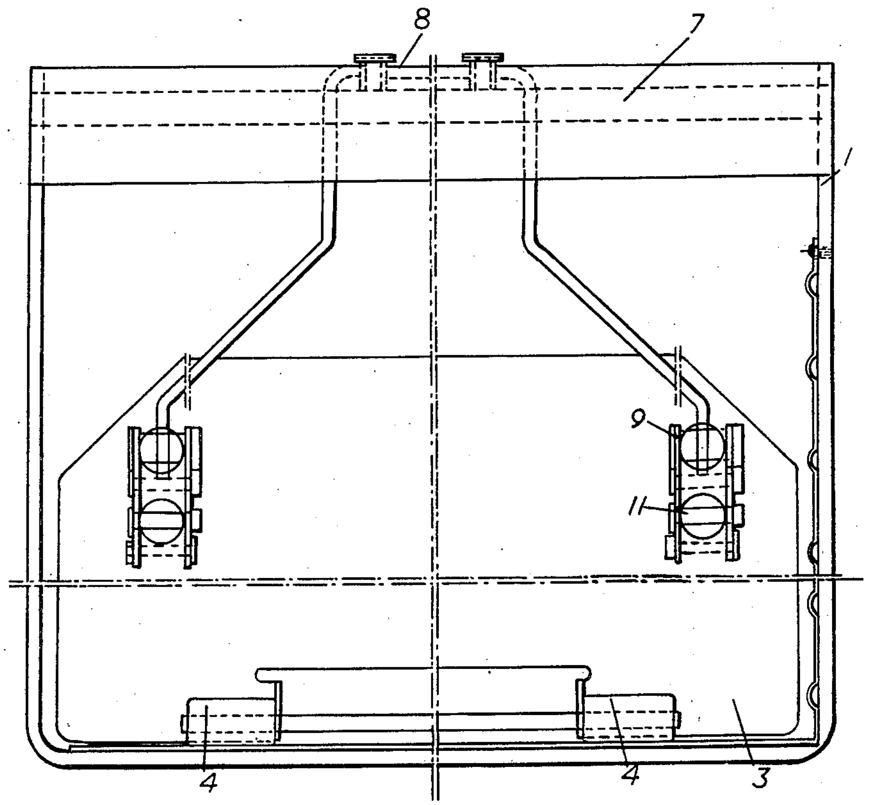
Figure 4:
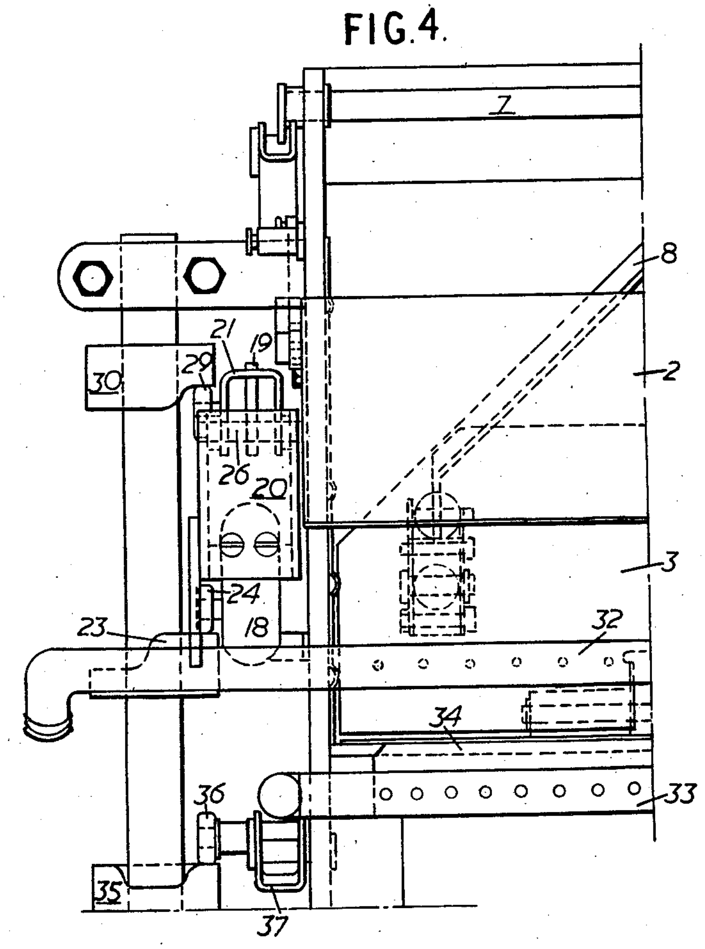
Figure 5:
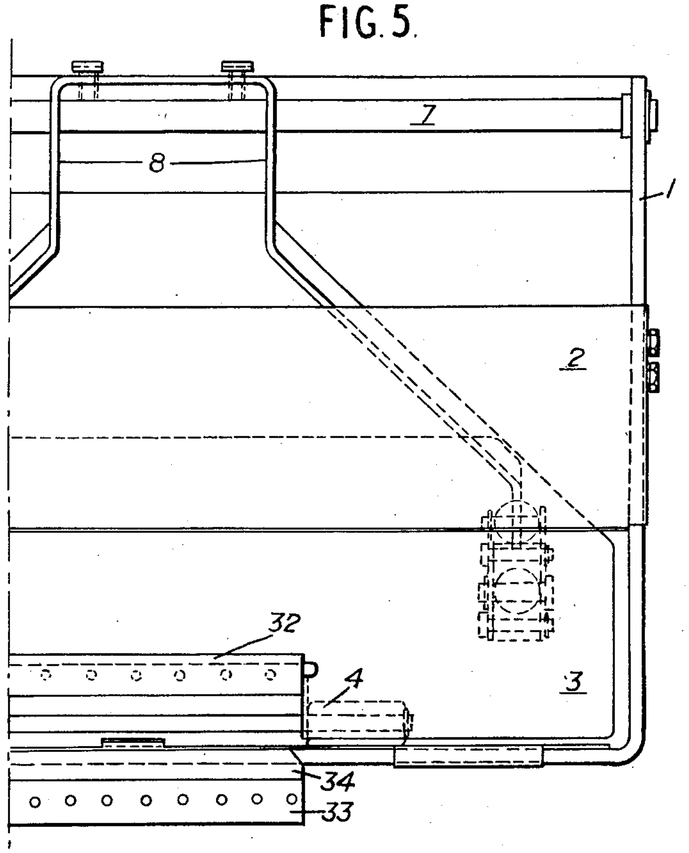
Figure 6:
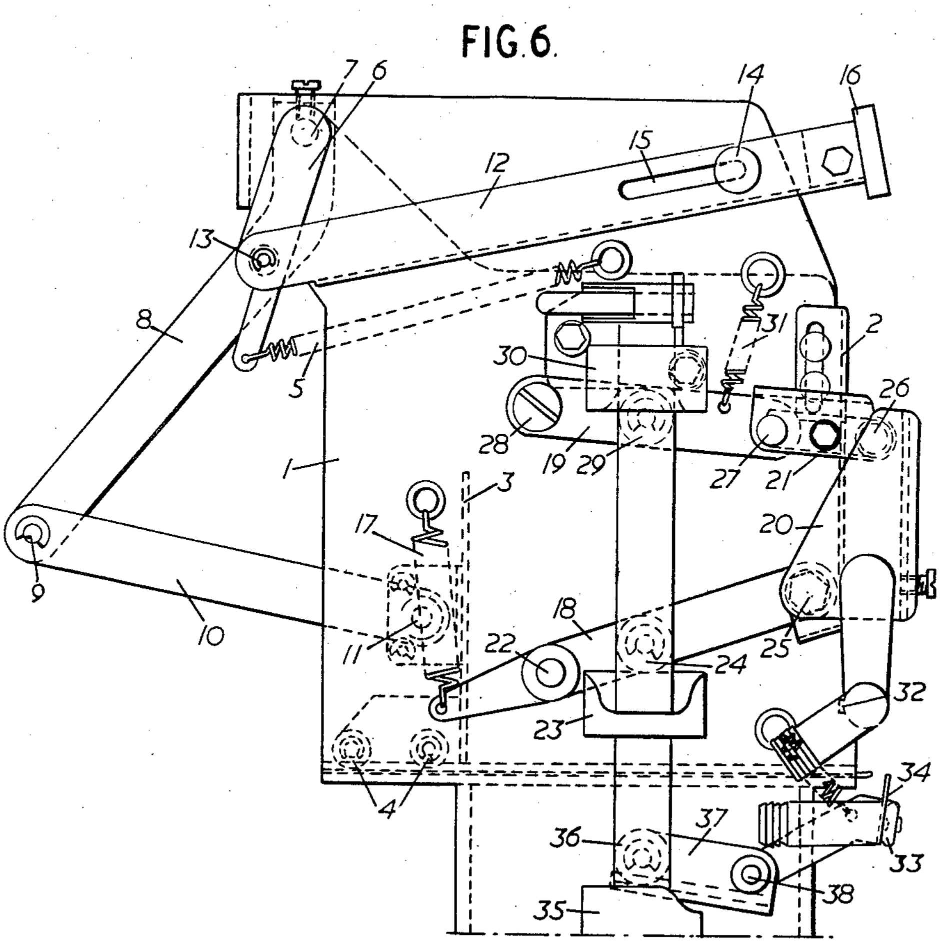
FIG. 6 is a left-hand side view of the part represented on FIGS. 4 and 5.

(2) During the second stroke, roller 29 penetrates in the hollow part of cam 30 and consequently articulation 27 is displaced upwards, pushed part 21 forward which, in its turn, makes part 20 rotate around articulation 25. Due to this movement, the suction part 32 is displaced backwards against the cheque to be extracted to reach the position represented (FIG. 6).

Figure 7:
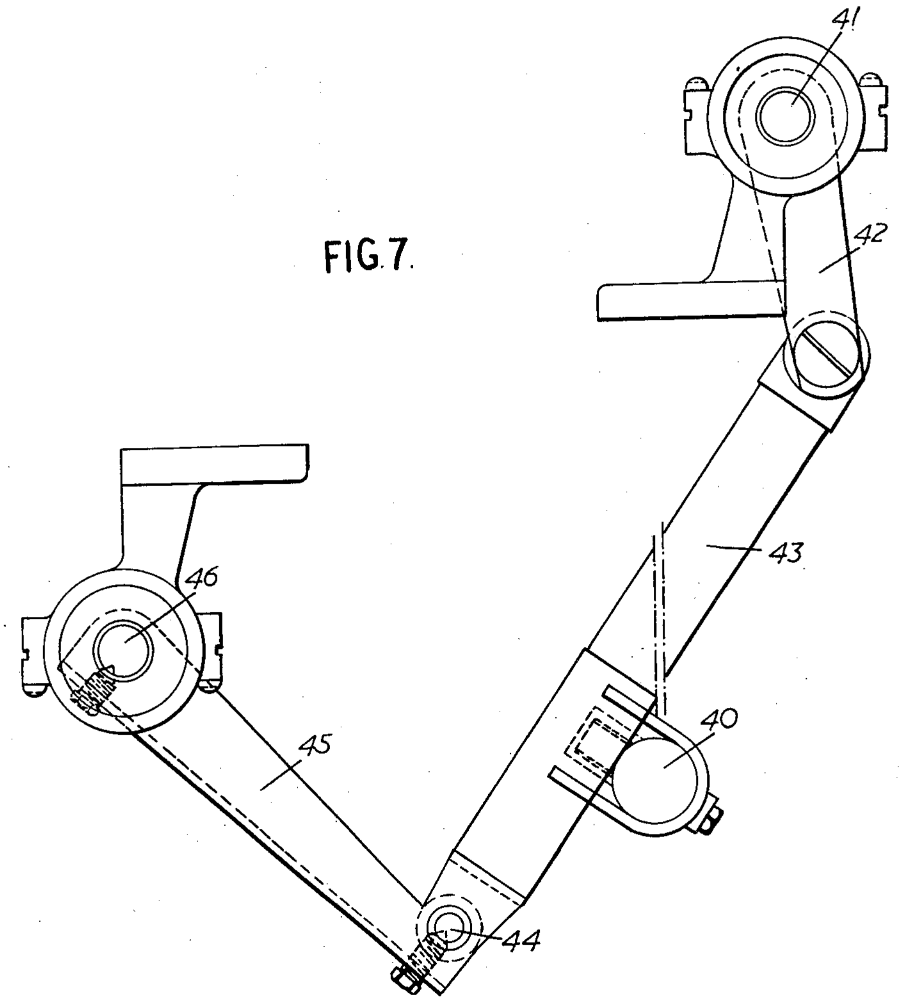
FIG. 7 is a right-hand side view of the mechanism carrying the pneumatic device which places the document in the reading position.

(3) and (4) The third strike is the reverse of the second and the fourth is the reverse of the first, with the sole difference that the pneumatic device 32 withdraws a cheque from the store by air depression, and takes it towards another pneumatic device 40, FIGS. 7 and 13(C), and that during the descent of the suction device 32, roller 29 passes in a slight hollow part of cam 30 so that the suction part 32 makes a slight backward movement, at the moment it passes in front of the suction part 33, so as to slightly touch the latter. The function of the sucking part 33 will be explained later. At the moment the suction part 32 withdraws a cheque from the store, abutment 34 is withdrawn in order not to hinder the extraction of the cheque and reaches the position represented in FIG. 6. This movement is obtained by the action of cam 35 which lifts roller 36 located at the back end of lever 37. This lever pivots around axis 38; its front end carries abutment 34 and is moved upwards by spring 39. After separation of the cheque by the suction device 32, abutment 34 rises to its rest position.

It may happen on the other hand that at the moment of extracting a cheque from the store by the suction device 32, a second cheque sticks to the first due primarily to a suction across the mechanographical perforations which may exist in the first cheque. To remedy this drawback, a suction device 33 is fixed together with abutment 34 to the front part of lever 37. When the suction device 32 lowers two cheques, the back of the second cheque slightly touches the suction device 33 (see above the fourth stroke of the movement of suction device 32) and this second cheque is maintained by the suction device 33 the suction of which is adjusted so as to be higher than that obtained when a maximum of perforations occur accidentally before the opening of suction device 32, but well below the total draw of the suction device 32, so that the latter can always pick up back from the suction device 33, during the following cycle, the cheque that the latter would have collected.

The cheque which has been extracted from the store and taken a few centimeters lower by the pneumatic device 32 is now picked up by a third pneumatic device 40 which seizes the cheque by its back and near its lower side, and makes it fall towards the so-called "reading"-position, FIGS. 12 and 13 (*a* to *d*). The movement of this suction device 40 is realized by the mechanism represented on FIG. 7 (seen from the right-hand side) as well as on FIG. 12 (general perspective view). In this mechanism, shaft 41 receives the driving force at one of its ends, and has at the other end a crank 42 at the end of which bar 43 is articulated which bar carries the pneumatic device 40. The other end of bar 43 is articulated in 44 at the end of an arm 45 which can rotate around axis 46. If reference is made to FIG. 7, crank 42 rotates in a counterclockwise manner.

In this case, the trajectory of the pneumatic device 40 is substantially rectilinear during the major part of the descent; it is during this rectilinear movement that this pneumatic device 40 conveys until the reading position the cheque initialy taken by device 32. The achieve this, the suction device 40 which moves behind the inclined wall 84 (FIG. 12) of the frame, being used as cheque support for the reading, has its apertures provided with short sleeves 47 protruding, during the descent, through the vertical elongated openings 48 made in wall 84. When the cheque has arrived in the reading position, the suction device abandons it by withdrawing behind wall 84, then rises and resumes its initial position opposite the suction device 32. This dropping of the cheque according to a substantialy rectilinear trajectory, parallel to the inclined wall mentioned above and at a short distance from the latter offers the advantage that the major part of the cheque remains constantly supported by said wall so that the cheque finally reaches a well determined reading position without risk of folding. The pneumatic action of the suction device 32 has to cease at the very moment the suction device 40 picks up from the suction device 32 the cheque which it is carrying. This condition can be realized by using any suction control means which is synchronized with the movements of the suction devices, but the preferred solution is the use of a pneumatic relay (FIG. 16) the control circuit of which is in communication with the suction pipes of the suction device 40, while the controlled circuit is connected to the suction device 32. As long as the suction device 40 is not obturated with a cheque, the air can penetrate in chamber 89 (FIG. 16) and its passage to the suction pipe V' is restrained by the narrowing 90; the depression existing in chamber 89 is thus too weak to overcome the strength of spring 91, by the action of this depression on membrane 92. In these conditions, drawer 93 is in the position shown on FIG. 16, i.e. the suction device 32 is subjected to the depression of pipe V'. This depression makes membrane 92 move in the sense of the arrow so that drawer 93 obturates pipe V while putting pipe 94 in communication with the free air. The suction of suction device 32 thus ceases immediately. In this way, it is the obturation of the apertures of suction device 40 by the cheque to be picked up which determines the end of suction of suction device 32 and which gives a more precise and sure operation.

The cheque abandoned in the reading position by suction device 40 is now kept in this position by the row of stops 49 constituted by tongues obtained by the crenated cutting of the upper edge of part 50 (FIG. 11), which tongues pass through horizontal slits being slightly below the vertical openings 48 in the wall 84 carrying the cheque.

The lower edge of the cheque has been guided and is kept in place on this stop part by ruler 51 which has solely been represented on FIG. 13(*d*). This ruler is in transparent material and is placed parallel with the row of stops 49, immediately above the latter, in a plane forming a sharp angle with wall 84 so as to lead the lower edge of the cheque towards stops 49. The lower side of this ruler must, with respect to wall 84, be at a smaller distance than the length of stops 49 so that the cheque deposited at the reading position cannot slide between the stops 49 and the ruler. The width and the inclination of the ruler are so chosen that the visibilty of the text of the cheque being in the reading position, remains complete.

The next movement of the cheque, i.e. its dropping from the reading position towards the envelope, is obtained by the mechanism represented on FIGS. 8 and 9 (front view) and 10 and 11 (left-hand side view). This mechanism consists of two groups of rollers coated with an adherent material such as rubber, in order to obtain a good driving action on the cheque. The upper group of rollers comprises a first shaft 52 on which several rollers 53 are fixed, and at one end, a pulley 54. This pulley 54 is actuated by a belt passing on another pulley (not indicated) fixed on a motor shaft. Shaft 52 thus performs a constant rotation during the whole time of the cycle of the mechanism described. A second shaft 55 also carrying several rollers 56 is mounted in free rotation between the upper ends of levers 57—57'. These levers 57—57′ can pivot in 58—58′ and carry part 50 mentioned above. Their movement is controlled by a cam 59 (FIG. 10) on which rolls roller 60 carried by lever 61, which pivots in 62 and at the upper end 63 of which a two-arm connecting part 64 is articulated actuating levers 57—57′. A spring (not represented) pushes lever 61 towards cam 59. In the rest position the rollers of shafts 52 and 55 are separated, which corresponds to the representation of FIGS. 10 and 11.

Part 50 which is fixed to levers 57—57′ is U-shaped and the lower edge 66 is cut notchwise as the upper edge; the tongues thus formed also pass through slits in the wall 84 carrying the cheques. However, the lower branch of the U being longer than the upper branch, the lower stops protrude more in front of the wall carrying cheques than the upper stops.

When the machine accomplishes a cycle, levers 57—57′ pivots backwards by the profile of cam 59; stops 49 and 66 withdraw behind the cheque carrier, but as the upper stops are shorter, the cheque is freed before the lower stops are completely withdrawn and before rollers 56 come in contact with rollers 53. The cheque is thus kept an instant on these stops 66 as indicated in (*e*) on FIG. 13, which ensures its positioning until rollers 56 start to press it against rollers 53 to carry it towards the lower group of the rollers; at this moment stops 66 withdraw in their turn. After the driving of the cheque by said rollers, cam 59 pushes back the assembly 60, 61, 64, 57—57′, 55 and 50, consequently, rollers 56 are separated from rollers 53 and 49 and 66 reappear across the slits of the cheque carrier.

The cheque which has left the upper group of rollers is guided by part 67 towards the lower rollers. The object of the latter is to afford the possibility of printing an information at the back of the cheque, for instance a date. To this effect, back roller 68 is of a diameter such that a small printing mechanism 85 (FIG. 14) can be included in a portion of the length of this roller and that one turn is sufficient to have the cheque dropped beyond this roller. This printing mechanism is mobile in the radial sense so that, according to needs, one might either bring it into contact with the back of the cheque when the latter passes between the lower rollers, or keep it withdrawn with respect to the cylindrical surface of roller 68. This movement is controlled by the electromagnet 69 (FIG. 12) by means of lever 70 pivoting in 71 and longitudinally displacing shaft 72 (FIG. 14), to which it is coupled by a device (not represented) permitting the latter to follow the rotating movement of roller 68. Shaft 72 slides in the inside of shaft 73 and will control said printing mechanism due to pins 88—88′ fixed radially to the inside end of shaft 72 and reaching the printing mechanism across buttonholes 86—86′ cut lengthwise in the hollow shaft 73. Said pins have their ends engaged in button-holes 87—87′ cut in the printing mechanism case slightly slanting with respect to the axis of roller 68, so that the longitudinal displacement of shaft 72 causes a radial displacement of the printing mechanism in its housing.

A part of the periphery of roller 68 has been hollowed as indicated in 74 (FIG. 13*f*) on the whole length of the roller. In the rest position, this hollowed part 74 is in the downward prolongation of wall 75 along which slides the cheque and is intended to receive and position the lower edge of the cheque so that the printing at the back is done correctly. The rotation of roller 68 is controlled from the motor shaft of the machine by means of Geneva mechanism 76 (FIG. 12) and gears 77 which, together, determine the moment, the duration and the rotation angle of roller 68.

Shaft 78 which bears various small pressing rollers 79, can rotate freely between two prolongations 80 of the lateral walls of the machine and can be displaced radially, with respect to rollers 68, in the elongated openings 81.

These openings 81 permit a displacement such that rollers 79 can come into contact with roller 68 during its rotation, but not when the hollow part 74 is opposite rollers 79. Shaft 78 is moved towards roller 68 by springs 82, by means of small buttonhole parts 83.

After its passage between the lower rollers, the cheque drops in a receptacle placed below the machine for example an envelope such as described in the Belgian Patent No. 544,840 (J. Young 2).

The phase relation between the movements of the various components of this mechanism is shown by the graphs of FIG. 15, representing a complete cycle (360°) of the driving shaft, and in which:

Graph (*a*) represents the movement of the upper lever 19, the rising parts indicating the movement, upwardly, of articulation 27, thus corresponding to the movement, backwardly, of the suction part 32, and vice versa;

Graph (*b* )represents the movement of the lower lever 18, the rising parts corresponding to the movement, upwardly, of the suction part 32 and vice versa;

Graph (*c*) represents the movement of abutment 34, the lower part corresponding to the low position of said abutment;

Graph (*d*) represents the movement of the suction part 40, the falling part corresponding to the movement, downwardly, of said suction device, thus the movement by which it brings the cheque of the reading position;

Graph (*e*) represents the displacement of shaft 55, the upper part corresponding to the contact of rollers 56 with rollers 53;

Graph (*f*) represents the movement of roller 68, the upper part corresponding to the rotation of this roller.

While the principles of the invention have been described above in connection with specific apparatus, it is to be clearly understood that this description is made only by way of example and not as a limitation on the scope of the invention.

I claim:

1. A mechanism for the automatic processing of documents comprising a store adapted to receive documents disposed on edge, a first suction gripper operating on one side of a document to extract said document from the output of said store, a second suction gripper acting on the opposite side of said document from said first suction gripper to separate extra documents from said first suction gripper and to retain said extra documents in a position for subsequent handling without stopping said mechanism, a third suction gripper operating on the opposite side of said document from said first suction gripper, pneumatic valve means connected to said first suction gripper and said third suction gripper so that the suction grip of said first suction gripper is released only when said third suction gripper seizes said document, drive means connected to said third suction gripper to cause said third suction gripper to deposit said document in an intermediate position suitable for examination.

2. A mechanism for the automatic processing of documents comprising a store adapted to receive documents disposed on edge, a presser located within said store and adapted to feed said documents towards the outlet of said store, a first suction gripper to remove the document from the outlet of said store, a second suction gripper disposed to apply suction on the opposite side of said document from said first suction gripper, driving means to cause said first suction gripper to carry said document past said second suction gripper, whereby extra sheets are retained by said second suction gripper for subsequent handling without stopping said mechanism and only one sheet at a time is retained by said first suction gripper, a third suction gripper operating to apply suction to said document on the opposite side of said document from said first suction gripper, driving means connected to said third suction gripper to cause said third suction gripper to transfer said document from said first suction gripper to said third suction gripper and to deposit said document in an intermediate positon suitable for examination of said document.

3. A mechanism for the automatic processing of documents comprising a store adapted to receive documents disposed on edge and having an outlet, a first suction gripper to remove a document from said store, a second suction gripper disposed to apply suction to the opposite side of said document from said first suction gripper whereby extra sheets extracted from said store by said first suction gripper are retained by said second suction gripper in a position for subsequent handling without stopping said mechanism, a third suction gripper disposed to apply suction to the opposite side of said document as said first suction gripper, a pneumatic valve connected to both said first suction gripper and said third suction gripper and responsive to the presence of a document at said third suction gripper so that said first suction gripper is caused to release control of said document by said valve only when said document is grasped by said suction gripper, drive means connected to said third suction gripper to cause said third suction gripper to deposit said document at an intermediate positon suitable for examination, first movable support means disposed at the end of the travel of said third suction gripper to receive said document at said intermediate position, second movable support means disposed below said first support means, and connected to said first support means mechanical seizing means disposed between said support means, said mechanical seizing means adapted to transfer said document to the output of said mechanism.

4. A mechanism for the automatic examination of documents comprising a store adapted to receive documents disposed on edge, said store having a presser adapted to push said documents toward the output of said store, a first suction gripper to remove a document from the output of said store, a second suction gripper disposed to apply suction to the opposite side of said document as said first suction gripper and having a suction strength somewhat less than the suction strength of said first suction gripper whereby any extra documents extracted by said first suction gripper from said store are retained by said second suction gripper in a proper position for subsequent use by said mechanism without stopping said mechanism, a third suction gripper disposed to apply suction on the opposite side of said document from said first suction gripper, a pneumatic control valve connected to both said first and third suction grippers and responsive to the pressure in said third suction gripper whereby only the positive grasping of said document by said third suction gripper causes said first suction gripper to release its grasp on said document, mechanical driving means connected to said third suction gripper to cause said third suction gripper to deposit said document in an intermediate station suitable for examination, first movable supports disposed to properly position said document in said intermediate examination position, a first set of continuously rotating rollers, a second set of rotatable rollers, a second set of movable supports disposed below and connected to said first set of movable supports whereby when said first movable supports are withdrawn said document is propelled forward by said continuously rotating rollers and whereby when said second supports are withdrawn said document is pressed between both said first and second sets of rollers and propelled to the output of said mechanism.

5. A mechanism for the automatic examination and processing of documents comprising a store adapted to receive documents disposed on edge, a presser disposed within said store to exert forward pressure on said documents, said store having an output wall partially cut away to expose a portion of the document to be extracted, a first suction gripper adapted to remove a document from said store through the cutout portion of said wall of said store, a second pneumatic device disposed to apply suction to the opposite side of said document as said first suction gripper, said second suction gripper having a separating blade disposed thereon to facilitate the extraction of the document by said first suction gripper, mechanical drive means connected to said first suction gripper to cause it to carry said document across the face of said second suction gripper whereby extra documents extracted by said first suction gripper are retained by said second suction gripper in a position for subsequent handling by said mechanism without stopping said mechanism, support means having slots therein, a third suction gripper having nozzles extending through said slots in said support means, said third suction gripper being adapted to apply suction on the opposite side of said document from said first suction gripper, a pneumatic control valve connected to said first and third suction grippers and responsive to the pressure in said third suction gripper, said valve controlling the suction supply to said first suction gripper, mechanical drive means connected to said third suction gripper to apply said third suction gripper to the opposite side of said document so that the positive grasping of said document by said third suction gripper causes the suction supply to said first suction gripper to be cut off by said pneumatic valve, a first set of movable supports to receive said document, cam-actuated suction control means connected to said third suction means to cause said third suction means to release said document when said document is deposited on said first movable supports for examination, a second set of movable supports spaced apart from and parallel to said first set of movable supports, a set of continuously rotating rollers disposed between said first and second supports, a set of movable rollers disposed opposite said first rollers and between said movable supports, mechanical drive means connected to said movable rollers and said movable supports whereby when said first set of movable supports is removed said document is propelled by said continuously rotating rollers toward said second set of supports and whereby when said document reaches said second set of supports said document is pressed between said movable rollers and said continuously rotating rollers to propel said document to the output of said mechanism.

References Cited in the file of this patent

UNITED STATES PATENTS

| | | |
|---|---|---|
| 467,762 | Ethridge | Jan. 26, 1892 |
| 1,024,186 | Dick | Apr. 23, 1912 |
| 1,229,849 | Zeitz | June 12, 1917 |
| 1,373,187 | Freeman | Mar. 29, 1921 |
| 1,432,032 | Novick | Oct. 17, 1922 |
| 1,574,262 | Sheldrick | Feb. 23, 1926 |
| 1,796,296 | Mack | Mar. 17, 1931 |
| 1,857,918 | Kohler | May 10, 1932 |
| 2,063,479 | Belluche | Dec. 8, 1936 |
| 2,091,283 | Johnson | Aug. 31, 1937 |
| 2,169,400 | Stromberg et al. | Aug. 15, 1939 |
| 2,236,363 | Backhouse | Mar. 25, 1941 |
| 2,294,273 | Buxbaum | Aug. 25, 1942 |
| 2,342,190 | Gollwitzer | Feb. 22, 1944 |
| 2,444,504 | Grogan | July 6, 1948 |
| 2,589,428 | Pearce | Mar. 18, 1952 |
| 2,862,707 | Voysey | Dec. 2, 1958 |